(12) United States Patent
Ning

(10) Patent No.: US 6,441,971 B2
(45) Date of Patent: Aug. 27, 2002

(54) COMPACT LENS WITH EXTERNAL APERTURE STOP

(76) Inventor: Alex Ning, 2930 Zircon Pl., Carlsbad, CA (US) 92009

( * ) Notice: Subject to any disclaimer, the term of this patent is extended or adjusted under 35 U.S.C. 154(b) by 0 days.

(21) Appl. No.: 09/921,248

(22) Filed: Aug. 3, 2001

Related U.S. Application Data

(63) Continuation-in-part of application No. 09/405,076, filed on Sep. 27, 1999, now Pat. No. 6,282,033.

(51) Int. Cl.$^7$ ............................. G02B 9/00; G02B 13/18
(52) U.S. Cl. ..................... 359/739; 359/793; 359/784; 359/716
(58) Field of Search ................................ 359/738, 739, 359/793–795, 784, 716

(56) References Cited

U.S. PATENT DOCUMENTS

| | | | | | |
|---|---|---|---|---|---|
| 3,912,379 A | * | 10/1975 | DeJager | ..................... | 359/652 |
| 4,212,517 A | | 7/1980 | Fugii | ..................... | 359/763 |
| 4,525,039 A | | 6/1985 | Defuans | ..................... | 359/739 |
| 4,787,724 A | * | 11/1988 | Kudo et al. | ................. | 359/739 |
| 4,892,398 A | * | 1/1990 | Kudo et al. | ................. | 359/708 |
| 5,050,970 A | * | 9/1991 | Kittaka | ..................... | 359/653 |
| 5,606,461 A | * | 2/1997 | Ohshita | ..................... | 359/716 |
| 5,739,965 A | * | 4/1998 | Ohno | ..................... | 359/717 |
| 5,999,334 A | * | 12/1999 | Kohno | ..................... | 359/733 |
| 6,011,648 A | * | 1/2000 | Mukai et al. | ............... | 359/362 |
| 6,282,033 B1 | * | 8/2001 | Ning | ..................... | 359/739 |

FOREIGN PATENT DOCUMENTS

| | | | | | |
|---|---|---|---|---|---|
| JP | 63-61217 | * | 3/1988 | ................. | 359/784 |

\* cited by examiner

*Primary Examiner*—Evelyn A Lester
(74) *Attorney, Agent, or Firm*—Donn K. Harms

(57) ABSTRACT

A lens assembly particularly suited to use with high resolution digital cameras suitable for incorporation in compact portable electronic devices such as cellular telephones, portable digital assistants and the like. The lens assembly includes a distal meniscus lens element formed from glass, and first and second, aberration correcting, aspheric lens elements formed from plastic, such as an acrylic, and positioned proximal to the meniscus lens element. An aperture stop plane is provided just in front of the front group. A fixed aperture stop or a combined variable aperture and shutter device may be positioned at the aperture stop plane.

14 Claims, 1 Drawing Sheet

COMPACT LENS WITH EXTERNAL APERTURE STOP

This Application is a Continuation-in-part of U.S. patent application Ser. No. 09/405,076, filed Sep. 27, 1999, now U.S. Pat. No. 6,282,033 B1.

FIELD OF THE INVENTION

This invention relates to compact lenses for digital camera applications; in particular, for very compact digital cameras such as could be incorporated into a cellular telephone, personal digital assistant, or other very small electronic device.

BACKGROUND OF THE INVENTION

Digital cameras utilizing high-resolution electronic imaging sensors require high resolution optics. For the consumer market, it is important that the lenses can be produced in high volume inexpensively. For use in very compact digital cameras, and cameras that might be incorporated into devices such as palm-sized computers, cellular telephones and the like, the lens must be very compact. In particular, it must have a very short length from the lens front surface to the image plane.

In the prior art, high resolution lenses have generally been made up of several individual lens elements in order to balance the inherent optical aberrations. These lenses that require a large number of elements tend to be relatively large, heavy, and expensive to manufacture. (The cost of these lenses increases with the number of elements, also resulting in increased costs in assembling and mounting them in a lens cell.) Prior lenses are generally designed using all spherical surfaces or using at least some aspheric elements in which one or both surfaces are non-spherical. Where all elements have spherical surfaces, generally a high number of lens elements is required, making the lens long and expensive to produce.

Aspheric lenses have some optical advantages, but cannot be easily produced by traditional glass grinding and polishing techniques. Aspheric elements are typically produced by molding plastics or low melt temperature glasses. While molded plastic elements are inexpensive to produce, the level of precision of the lenses is not always sufficient for high-resolution cameras, especially if a plastic element is used primarily as a focusing element. In addition, the optical properties of most plastic materials change with changes in temperature and humidity. The index of refraction of the plastic lens materials changes with changes in temperature, such as going in and out of doors on very hot or very cold days. This change is a significant problem with the focusing element(s), but is of much less consequence with other elements which primarily correct for aberrations. Lenses with all glass elements can overcome this problem, but tend to be large and excessively expensive for use in compact digital cameras used in other devices, such as an accessory built into a cellular phone.

Chemical film, as used in conventional film cameras, can be exposed with light coming from any direction, even at a low angle to the film surface. For digital cameras using inexpensive electronic imagers, to achieve optimum performance the light should contact the imaging media at angles of less than about 15° to a line normal to the imaging media surface.

Prior lens designs generally have separate variable apertures and shutters, increasing the length of the lens assembly. Even where both these functions are combined in one device, that device must be positioned between lens elements because the aperture stops of conventional designs are located between lens elements.

Having the aperture stop between lens elements, as in the Double Gaussian designs, is believed to make correction of aberrations easier. Typical of such lens designs is that described by Fugii in U.S. Pat. No. 4,212,517, where the aperture stop is located between the third and fourth elements. This provides a degree of lens symmetry about the apertures stop, resulting in reduction in off-axis aberrations such as coma and distortion. It is generally believed that achieving good aberration correction without this symmetrical arrangement of lens elements would be difficult. However, it is difficult and expensive to integrate a variable aperture/shutter device with this type of optical design since it is difficult to keep the lens elements positioned precisely with the aperture device located between the elements.

Defuans, in U.S. Pat. No. 4,525,039, describes a lens design with the aperture stop in front of the first element. That design requires that the first element be plano-convex, with the plano surface facing the aperture. However, that design has a maximum relative aperture of f/4, too slow for use with cameras to be used at relatively low light levels. That design further requires seven elements, making it excessively long, heavy and expensive to produce for use in compact digital cameras.

Therefore, there is a continuing need for improved lenses that are not temperature sensitive, have excellent low-light performance and are compact, short, light weight and inexpensive to produce while using conventional, well-proven manufacturing methods.

SUMMARY OF THE INVENTION

The above-noted problems, and others, are overcome in accordance with this invention by a lens for digital cameras; in particular, such cameras that are incorporated into another device such as a cell phone, personal digital assistant and the like, that is extremely compact and has a short length from the front element surface to the imaging plane, have three lens elements with the front element formed from glass and the others from plastic and have excellent optical characteristics. For optimum results the lens has an aperture stop in front of the lens, external to the lens. If desired, an optional variable aperture/shutter can be positioned at the aperture stop position with precision.

The lens comprises three lens elements. The first, or front, lens element is a meniscus lens and is formed from a suitable glass by conventional lens grinding and polishing methods. Both surfaces of this lenses are spherical. The second and third elements are aspherical, formed from a suitable plastic by molding. Aspherical elements have at least one surface being a non-spherical surface. For optimum results, both surfaces of the aspheric elements are aspherical. An electronic imaging sensor is spaced a suitable distance from the rear element. Preferably, a cover glass is provided over the sensor surface. The use of a glass front element greatly reduces lens temperature sensitivity when the lens is taken from areas at great temperature differences, such as when bringing a camera into a building on a hot summer day or cold winter day.

Preferably, the aperture/shutter device is external to the optical elements so the optical elements can be assembled into a precision lens barrel independent of the aperture/shutter device. The performance of such a lens can be tested and verified before integration with an optional aperture/shutter device. Integration of such pre-assembled lenses with the aperture/shutter device can be performed with high reliability and repeatability, resulting in high yields in volume manufacturing.

It is, therefore, an object of this invention to provide a compact lens assembly particularly suitable for use in compact digital cameras, especially those incorporated into other compact electronic devices such as cellular phones, personal digital assistants and the like.

Another object of this invention is to provide a lens assembly for digital cameras that has very low sensitivity to changes in temperature.

A further object is to provide a digital camera lens having an extremely short length from the aperture/shutter device to the sensor imaging plane.

Yet another object is to provide a digital camera lens having a glass front element and two plastic elements to provide an optimum combination of imaging quality, small F-stop, and low manufacturing cost.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
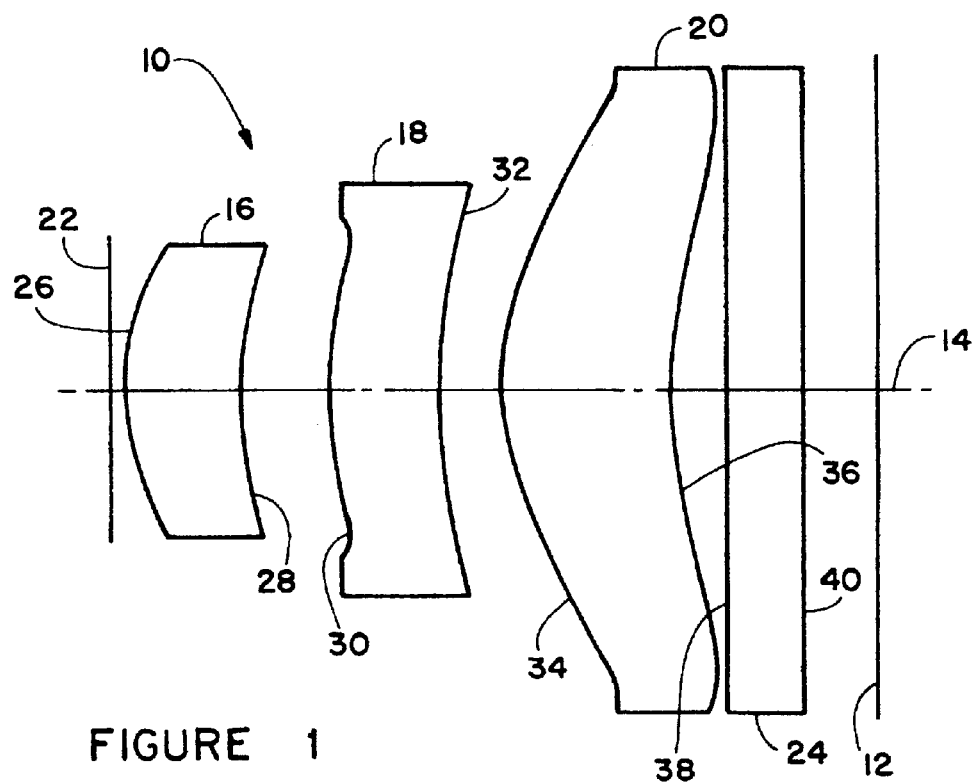
FIG. 1 is a schematic axial section view of a first embodiment of the lens of this invention.

Referring to FIG. 1, there is seen a schematic axial section view of a lens assembly 10 for forming an image at a image plane on imaging sensor 12, which in a digital camera is the sensor plane and in a film type camera is the film plane. The front or distal end of the lens is to the left in FIG. 1. Line 14 represents the lens optical axis.

The lens assembly 10 includes a distal meniscus lens element 16, a central aspherical lens element 18 and a proximal aspherical lens element 20. While lens element 18 may have one spherical surface and one aspheric surface, if desired, having both surfaces aspheric is preferred for optimum results. The aperture stop plane is schematically indicated by line 22, closely adjacent to distal lens element 16. At aperture stop plane, a conventional fixed aperture stop, or a variable aperture stop and a shutter may be provided as desired. In the absence of a shutter, the imaging material is electronically operated to provide the desired exposure length. Distal element 16 provides most of the focusing power while elements 18 and 20 provide aberration compensation to correct for any optical aberrations present in element 14. All light rays passing through lens assembly 10 encounter the sensor 12 at angles within 15 degrees on either side of a line normal to the sensor, providing optimum efficiency.

The lens design shown in FIG. 1, and detailed in the lens data table below, preferably uses Schott SK 16 glass for element 16 and an optical grade acrylic for aspherical elements 18 and 20. The glass distal lens element 16 is very temperature insensitive, avoiding any problems resulting from taking the lens between areas at greatly differing temperatures, such as taking the device using the lens into a building on a very hot summer day or a very cold winter day.

The vertex spacings between lens elements are also listed in Table 1. For best results, a cover glass 24 is placed over sensor 12. Aperture stop 22 is preferably as close to distal element 16 as is practical. Overall length from aperture stop 22 to image plane 12 for the lens of this embodiment which has an effective focal length of 4.8 mm and is suitable for ¼" format images, is about 5.3 mm. While this overall length is optimum for a ¼"-format imager, the lens assembly may be scaled to provide other configurations according to the format size of the imager.

Lens element 16 has spherical surfaces and is formed from a suitable glass, such as SK 16, a low-index, low-cost glass from Schott Optical Glasses in Germany or Zlaf2, a high index (Nd=1.80279, Vd=46.76), which is more expensive, available from GuangMing Optical Glasses in China. Aspherical elements 18 and 20 are formed from an acrylic material, also known as PMMA, from Imperial Chemical in the United Kingdom. Cover glass 24, when used, is typically formed from B270 glass from Schott. Any suitable anti-reflection or other coatings may be applied to the lens elements and cover glass.

Lens 10 of FIG. 1 is completely asymmetrical. This lens will provide excellent image quality over a field of view of x/ 30 degrees at a relative aperture as large as f/2.5. This lens is well suited for use with state of the art digital sensors having a resolution about 640×480 pixels. The maximum geometric distortion of this lens is typically under about 5%.

Details of the structure of an optimum version of the FIG. 1 general embodiment is provided in Table I. All radii and distances are in millimeters. Each lens is identified by the corresponding drawing reference number, with surfaces defined by serial radius numbers from the distal to proximal end. The overall length from the aperture stop to the image plane is 5.3 mm. The effective focal length is 4.2 mm in air. The maximum aperture is f/2.5.

TABLE I

| Surface | Description | Radius | Thickness | Material | Diameter | Conic |
|---|---|---|---|---|---|---|
| 25 | Aperture location | Infinity | −3.289371e−005 | | 1.674 | 0 |
| 26 | Spherical Surface | 1.883689 | 0.8158032 | SK16 | 2.009056 | 0 |
| 28 | Spherical surface | 3.045904 | 0.6753982 | | 2.031429 | 0 |
| 30 | Aspheric surface | 3.566412 | 0.6999804 | ACRYLIC | 2.324429 | 0 |
| 32 | Conic surface | 2.083898 | 0.4980362 | | 2.859842 | −19.09159 |
| 34 | Conic surface | 1.590613 | 1.164754 | ACRYLIC | 4.248483 | −4.613664 |
| 36 | Aspheric surface | 3.246891 | 0.3960773 | | 4.485452 | 0 |
| 38 | Cover glass | Infinity | 0.55 | B270 | 4.490254 | 0 |
| 40 | Cover glass | Infinity | 0.5 | | 4.50803 | 0 |
| 42 | Image plane | Infinity | | | 4.607606 | 0 |

Surface 30, 32, 34 and 36 are all aspherical and described the the following equation:

$$z(r) = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10}$$

Where:

Z is the surface sag
C=1/R, R is the radius of the surface
k is the conic constant
r is the distance from optical axis
$\alpha$ (1, 2, 3, 4, 5, etc.) are the aspheric coefficients
For surface 32 and 34 (both are conic surfaces), the $\alpha$ (1, 2, 3, 4, 5, etc.) are all zero.
For surface 30 and 36, the conic constants are zero. The $\alpha$ (1, 2, 3, 4, 5, etc.) are given as follows:

| Surface 30 | EVENASPH |
|---|---|
| Coeff on r 2 | 0 |
| Coeff on r 4 | −0.06370215 |
| Coeff on r 6 | −0.016150584 |
| Coeff on r 8 | −0.039375843 |
| Coeff on r 10 | −0.026321689 |

-continued

| Surface 36 | EVENASPH |
|---|---|
| Coeff on r 2 | 0 |
| Coeff on r 4 | −0.012203864 |
| Coeff on r 6 | −0.0026530826 |
| Coeff on r 8 | 0.00030428755 |
| Coeff on r 10 | −4.7006906e−005 |

Index of refraction of material:

For SK16 glass:

Nd = 1.62041
Vd = 60.32

For Acrylic (PMMA) plastic:

Nd = 1.4917
Vd = 55.31

Figure 2:
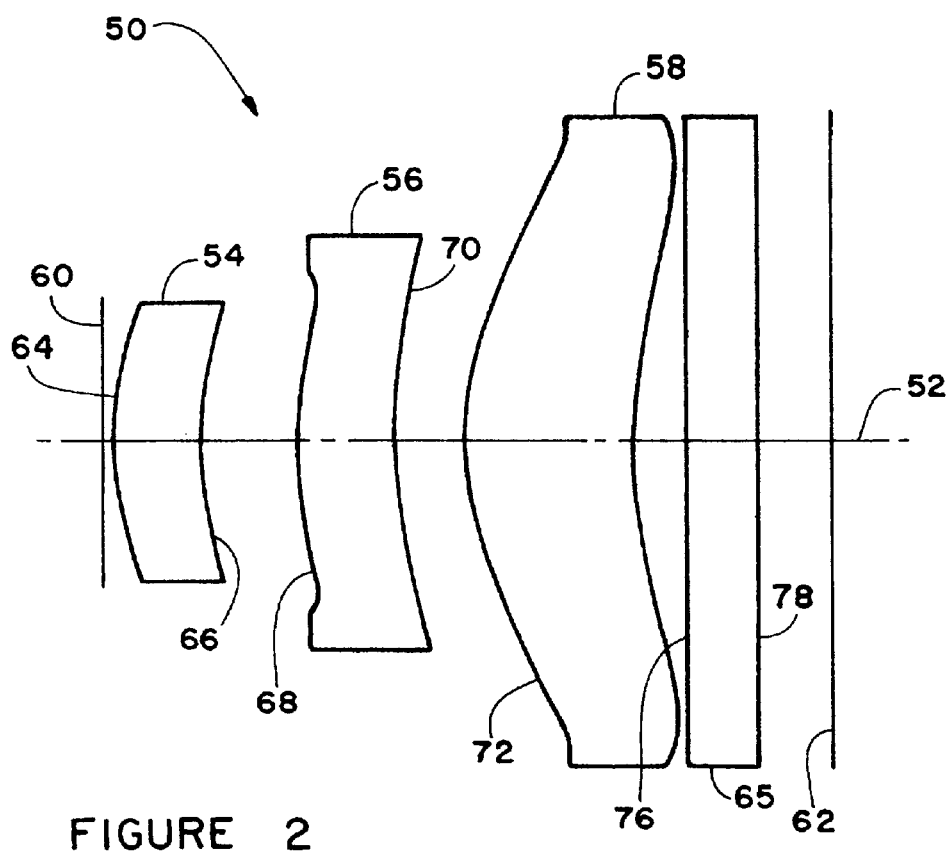
FIG. 2 is a schematic axial section view of a second embodiment of the lens of this invention.

FIG. 2 is a schematic axial section view through a lens 50. Lens 50 is generally similar to lens 10, with changes to accommodate a different glass in the distal element and the corresponding changes in the other elements to accommodate the effects of the different glass. Other glasses may be used, with similar variations in lens element characteristics. As with the lens of FIG. 1, the FIG. 2 lens is asymmetrical.

Because of excellent correction of aberrations, lens 30 will provide excellent image quality over a field of view of ±30 degrees. Lens 30 has an effective focal length of 4.2, a length of 5.3 and a maximum aperture of f/2.5.

Lens assembly 50 consists of one spherical glass element and two aspheric plastic elements along an axis 52. Lens 50 includes a distal glass meniscus lens element 54 and two proximal plastic aspherical lens elements 56 and 58. The aperture stop plane is schematically indicated by line 60, closely adjacent to element 54. The image sensor plane is indicated at 62. A cover glass 64 is preferably placed over the sensor. Distal element 54 provides most of the focusing power while proximal elements 56 and 58 provides aberration compensation. The spacings between the elements is given in Table II. Aperture stop 42 is preferably as close to distal element 32 as practical. Lens 50 may be mounted in a lens barrel in any suitable manner, such as by threaded retaining rings.

Detailed structural parameters of an optimum lens of the sort shown in FIG. 2 are provided in Table II, wherein surface radius and axial distances are shown in millimeters and the surfaces are identified by reference numbers from the distal to the proximal end as shown.

TABLE II

| Surface | Description | Radius | Thickness | Material | Diameter | Conic |
|---|---|---|---|---|---|---|
| 60 | Aperture | Infinity | −2.735838e−005 | | 1.674 | 0 |
| 64 | Spherical surface | 2.058406 | 0.7793137 | C-ZLAF2 | 1.96092 | 0 |
| 66 | Spherical Surface | 2.883771 | 0.7532283 | | 1.956528 | 0 |
| 68 | Aspheric surface | 3.696814 | 0.6999906 | ACRYLIC | 2.359079 | 0 |
| 70 | Conic surface | 2.186806 | 0.4870961 | | 2.906413 | −22.34914 |
| 72 | Conic surface | 1.645422 | 1.198582 | ACRYLIC | 4.283354 | −5.091541 |
| 74 | Aspheric Surface | 3.544696 | 0.3318456 | | 4.545027 | 0 |
| 76 | Cover glass | Infinity | 0.55 | BK7 | 4.544323 | 0 |
| 78 | Cover glass | Infinity | 0.5 | | 4.541721 | 0 |
| 62 | Image plane | Infinity | | | 4.613017 | 0 |

Aspherical surfaces are surface 66, 68, 70 and 72. The equations for those surfaces are given as follows:

Where:

Z is the surface sag
C=1/R, R is the radius of the surface
k is the conic constant
r is the distance from optical axis
$\alpha$ (1, 2, 3, 4, 5, etc.) are the aspheric coefficients
For surface 68 and 70 (both are conic surfaces), the $\alpha$ (1, 2, 3, 4, 5, etc.) are all zero.
For surface 66 and 72, the conic constants are zero. The $\alpha$ (1, 4, 5, etc.) are given as follows:

| Surface 66 | EVENASPH |
|---|---|
| Coeff on r 2 | 0 |
| Coeff on r 4 | −0.055969229 |
| Coeff on r 6 | −0.016164047 |
| Coeff on r 8 | 0.034963476 |
| Coeff on r 10 | −0.021598842 |

| Surface 72 | EVENASPH |
|---|---|

-continued

| | |
|---|---|
| Coeff on r 2 | 0 |
| Coeff on r 4 | −0.011453885 |
| Coeff on r 6 | −0.0023845294 |
| Coeff on r 8 | 0.00033512568 |
| Coeff on r 10 | −5.3608643e−005 |

Index of refraction of material:

For Zlaf2 glass:

Nd = 1.80279
Vd = 46.76
For Acrylic (PMMA) plastic:

Nd = 1.4917

-continued

Vd = 55.31

Lens 50 is a very compact lens for one having these specifications, allowing the camera or other portable electronic device to be very low-profile.

While certain specific relationships, materials and other parameters have been detailed in the above description of preferred embodiments, those can be varied, where suitable, with similar results. Other applications, variation and ramifications of the present invention will occur to those skilled in the art upon reading the present disclosure. Those are intended to be included within the scope of this invention as defined in the appended claims.

I claim:

1. A compact lens assembly which comprises:
   a glass meniscus lens element at a distal assembly end;
   a first aspherical plastic lens element spaced proximally from said glass lens element;
   a second aspherical plastic lens element spaced proximally from said first aspherical plastic lens element; and
   an aperture stop located at an aperture stop plane adjacent to said distal end of said glass lens element at a predetermined distance from said glass lens element.

2. The compact lens assembly according to claim 1 wherein said lens assembly has a focal length from about 4.1 to 4.3 mm and an overall length from said aperture stop to an image plane of from about 5.2 to 5.4 mm.

3. The compact lens assembly according to claim 1 wherein said meniscus lens element is formed from a glass selected from the group consisting of C-ZLAF2, BK-7 and SK-16 glasses and said aspherical lens element are formed an acrylic material.

4. The compact lens assembly according to claim 1 further including a cover glass position proximal to said second aspherical lens element.

5. The compact lens assembly according to claim 1 wherein the lens assembly satisfies the following data:

| Surface | Description | Radius | Thickness | Material | Diameter | Conic |
|---|---|---|---|---|---|---|
| 22 | Aperture location | Infinity | −3.289371e−005 | | 1.674 | 0 |
| 26 | Spherical Surface | 1.883689 | 0.8158032 | SK16 | 2.009056 | 0 |
| 28 | Spherical surface | 3.045904 | 0.6753982 | | 2.031429 | 0 |
| 30 | Aspheric surface | 3.566412 | 0.6999804 | ACRYLIC | 2.324429 | 0 |
| 32 | Conic surface | 2.083898 | 0.4980362 | | 2.859842 | −19.09159 |
| 34 | Conic surface | 1.590613 | 1.164754 | ACRYLIC | 4.248483 | −4.613664 |
| 36 | Aspheric surface | 3.246891 | 0.3960773 | | 4.485452 | 0 |
| 38 | Cover glass | Infinity | 0.55 | BK7 | 4.490254 | 0 |
| 40 | Cover glass | Infinity | 0.5 | | 4.50803 | 0 |
| 42 | Image plane | Infinity | | | 4.607606 | 0 | wherein the conic and aspheric surfaces for said lens assembly are defined by the equation, the surfaces indicated being those designated in FIG. 1:

Where:
Z is the surface sag
C = 1/R, R is the radius of the surface
k is the conic constant
r is the distance from optical axis
$\alpha(1, 2, 3, 4, 5, \text{ect})$ are the aspheric coefficients wherein the listed elements and surfaces are numbered from the distal end of said lens assembly;
Surface data detail for said aspheric lens elements:

| | |
|---|---|
| Surface 30: | |
| Coef. on r 2 | 0 |
| Coef. on r 4 | −0.06370215 |
| Coef. on r 6 | −0.016150584 |
| Coef. on r 8 | 0.039375843 |
| Coef. on r 10 | −0.026321689 |
| Surface 36 | |
| Coef. on r 2 | 0 |
| Coef. on r 4 | −0.012203864 |
| Coef. on r 6 | −0.0026530826 |
| Coef. on r 8 | 0.00030428755 |
| Coef. on r 10 | −4.7006906e−005. |

6. The compact lens assembly according to claim 1 wherein the lens assembly satisfies the following data:

| Surface | Description | Radius | Thickness | Material | Diameter | Conic |
|---|---|---|---|---|---|---|
| 60 | Aperture | Infinity | −2.735838e−005 | | 1.674 | 0 |
| 64 | Spherical surface | 2.058406 | 0.7793137 | C-ZLAF2 | 1.96092 | 0 |
| 66 | Spherical Surface | 2.883771 | 0.7532283 | | 1.956528 | 0 |
| 68 | Aspheric surface | 3.696814 | 0.6999906 | ACRYLIC | 2.359079 | 0 |
| 70 | Conic surface | 2.186806 | 0.4870961 | | 2.906413 | −22.34914 |
| 72 | Conic surface | 1.645422 | 1.198582 | ACRYLIC | 4.283354 | −5.091541 |
| 74 | Aspheric Surface | 3.544696 | 0.3318456 | | 4.545027 | 0 |
| 76 | Cover glass | Infinity | 0.55 | BK7 | 4.544323 | 0 |
| 78 | Cover glass | Infinity | 0.5 | | 4.541721 | 0 |
| 62 | Image plane | Infinity | | | 4.613017 | 0 |

Wherein the conic and aspheric surfaces for said lens assembly are defined by the equation, the surface being those as indicated in FIG. 2:

Where:
Z is the surface sag
C =1/R, R is the radius of the surface
k is the conic constant
r is the distance from optical axis
$\alpha(1, 2, 3, 4, 5,$ etc$)$ are the aspheric coefficients Surface data detail for said aspheric lens elements:

| Surface 68 | |
|---|---|
| Coef. on r 2 | 0 |
| Coef. on r 4 | −0.055969229 |
| Coef. on r 6 | −0.016164047 |
| Coef. on r 8 | 0.034963476 |
| Coef. on r 10 | −0.021598842 |
| Surface 74 | |
| Coef. on r 2 | 0 |
| Coef. on r 4 | −0.011453885 |
| Coef. on r 6 | −0.0023845294 |
| Coef. on r 8 | 0.00033512568 |
| Coef. on r 10 | −5.3608643e−005. |

7. The compact lens assembly according to claim 1 wherein said aperture stop is selected from a fixed aperture and a variable aperture means.

8. The compact lens assembly according to claim 7 further including a shutter means also located substantially at said aperture stop plane.

9. In a compact digital camera having a camera body, a sensor for forming a digital image corresponding to varying light image falling thereon, a lens assembly for forming said light image, and an aperture stop for controlling light image intensity passing through said lens assembly, the improvement comprising:

said lens assembly comprising a glass meniscus lens element at a distal end of said lens assembly, a first aspherical plastic lens element spaced proximally from said glass lens element; and a second aspherical plastic lens element spaced proximally from said first aspheric plastic lens element;

said aperture stop located adjacent to said distal end of said lens assembly at a predetermined distance from said glass lens element; and a shutter/variable aperture combined with said aperture stop for shielding the sensor during digital image read-out from said sensor.

10. The improvement according to claim 9 wherein said lens assembly has a focal length of from about 4.0 to 4.3 mm and an overall length from said aperture stop to an image plane of from about 5.2 to 5.4 mm.

11. The improvement according to claim 9 wherein said meniscus lens element is formed from a glass selected from the group consisting of C-ZLAF2, BK-7 and SK-16 glasses and said bi-aspheric lens elements are formed from an acrylic material.

12. The improvement according to claim 9 further including a cover glass position proximal to said second lens element.

13. The improvement according to claim 9 wherein the lens assembly satisfies the following data:

| Surface | Description | Radius | Thickness | Material | Diameter | Conic |
|---|---|---|---|---|---|---|
| 22 | Aperture location | Infinity | −3.289371e−005 | | 1.674 | 0 |
| 26 | Spherical Surface | 1.883689 | 0.8156032 | SK16 | 2.009056 | 0 |
| 28 | Spherical surface | 3.045904 | 0.6753982 | | 2.031429 | 0 |
| 30 | Aspheric surface | 3.566412 | 0.6999804 | ACRYLIC | 2.324429 | 0 |
| 32 | Conic surface | 2.083898 | 0.4980362 | | 2.859842 | −19.09159 |
| 34 | Conic surface | 1.590613 | 1.164754 | ACRYLIC | 4.248483 | −4.613664 |
| 36 | Aspheric surface | 3.246891 | 0.3960773 | | 4.485452 | 0 |
| 38 | Cover glass | Infinity | 0.55 | BK7 | 4.490254 | 0 |
| 40 | Cover glass | Infinity | 0.5 | | 4.50803 | 0 |
| 42 | Image plane | Infinity | | | 4.607606 | 0 |

Wherein the conic and aspheric surfaces for said lens assembly are defined by the equation, the designated surfaces being as indicated in FIG. 1:

Where:
Z is the surface sag
C =1/R, R is the radius of the surface
k is the conic constant
r is the distance from optical axis
$\alpha(1, 2, 3, 4, 5,$ etc$)$ are the aspheric coefficients wherein the listed elements and surfaces are numbered from the distal end of said lens assembly;

Surface data detail for said aspheric lens elements:

| Surface 30 | |
|---|---|
| Coef. on r 2 | 0 |
| Coef. on r 4 | −0.06370215 |
| Coef. on r 6 | −0.016150584 |
| Coef. on r 8 | 0.039375843 |
| Coef. on r 10 | −0.026321689 |
| Surface 36 | |
| Coef. on r 2 | 0 |
| Coef. on r 4 | −0.012203864 |
| Coef. on r 6 | −0.0026530826 |
| Coef. on r 8 | 0.00030428755 |
| Coef. on r 10 | −4.7006906e−005 | wherein the listed elements and surfaces are numbered from the distal end of said lens assembly.

14. The improvement according to claim 9 wherein the lens assembly satisfies the following data, wherein the surfaces are as designated in FIG. 2:

| Surface | Description | Radius | Thickness | Material | Diameter | Conic |
|---|---|---|---|---|---|---|
| 60 | Aperture | Infinity | −2.735838e−005 | | 1.674 | 0 |
| 64 | Spherical surface | 2.058406 | 0.7793137 | C-ZLAF2 | 1.96092 | 0 |
| 66 | Spherical Surface | 2.883771 | 0.7532283 | | 1.956529 | 0 |
| 68 | Aspheric surface | 3.696814 | 0.6999906 | ACRYLIC | 2.359079 | 0 |
| 70 | Conic surface | 2.186806 | 0.4870961 | | 2.906413 | −22.34914 |
| 72 | Conic surface | 1.645422 | 1.198582 | ACRYLIC | 4.283354 | −5.091541 |
| 74 | Aspheric Surface | 3.544696 | 0.3318456 | | 4.545027 | 0 |
| 76 | Cover glass | Infinity | 0.55 | BK7 | 4.544323 | 0 |
| 78 | Cover glass | Infinity | 0.5 | | 4.541721 | 0 |
| 62 | Image plane | Infinity | | | 4.613017 | 0 |

Wherein the conic and aspheric surfaces for said lens assembly are defined by the equation:
Where:
  Z is the surface sag
  $C = 1/R$, R is the radius of the surface
  k is the conic constant
  r is the distance from optical axis
  $\alpha(1, 2, 3, 4, 5,$ etc$)$ are the aspheric coefficients
Surface data detail for said aspheric lens elements:

| Surface 68 | |
|---|---|
| Coef. on r 2 | 0 |
| Coef. on r 4 | −0.055969229 |
| Coef. on r 6 | −0.016164047 |
| Coef. on r 8 | 0.034963476 |
| Coef. on r 10 | −0.021598842 |
| Surface 74 | |
| Coef. on r 2 | 0 |
| Coef. on r 4 | −0.011453885 |
| Coef. on r 6 | −0.0023845294 |
| Coef. on r 8 | 0.00033512568 |
| Coef. on r 10 | −5.3608643e−005. |

* * * * *